[.63]

Alfred Dickinson.

Stump Extractor.

No. 118,594. Patented Aug. 29, 1871.

Witnesses
Chas. H. Poole
A. M. Warfield

Inventor.
Alfred Dickinson
By J. B. Woodruff
Attorney

UNITED STATES PATENT OFFICE.

ALFRED DICKINSON, OF OLEAN, NEW YORK.

IMPROVEMENT IN STUMP-EXTRACTORS.

Specification forming part of Letters Patent No. 118,594, dated August 29, 1871.

*To all whom it may concern:*

Be it known that I, ALFRED DICKINSON, of Olean, in the county of Cattaraugus and State of New York, have invented certain new and useful Improvements in Stump-Pullers; and the following is a full, clear, and exact description of the same, reference being had to the accompanying drawing making a part of this specification, in which—

Figure 1:
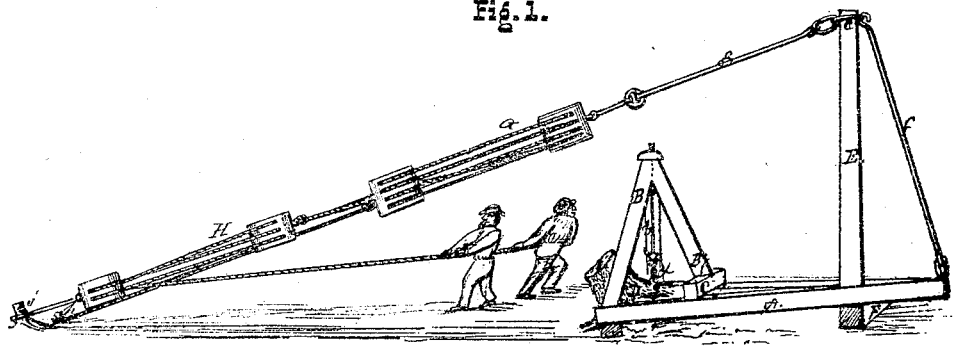
Figure 2:
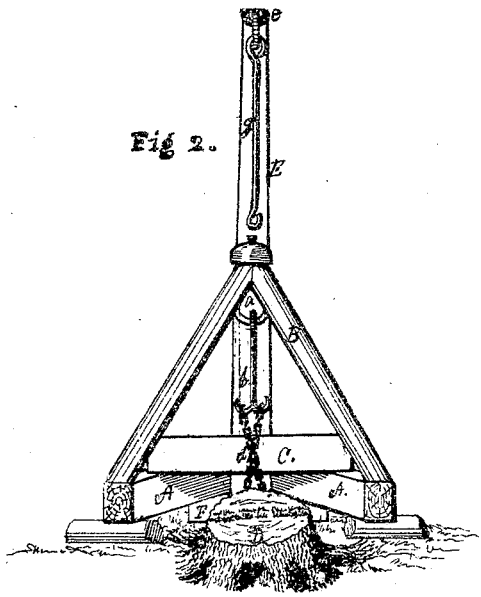
Figure 3:
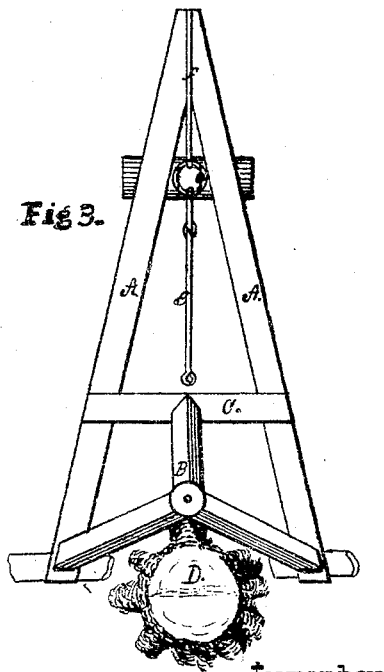

Figure 1 represents a side-view elevation of my apparatus complete, as combined and arranged and attached to the root of a stump in the act of turning it out, showing the tackle-blocks and the power applied by men to operate it. Fig. 2 shows the position, the frame, tripod, and whole apparatus as placed in relation to a stump to uproot it. Fig. 3 shows a plan or top view of the same.

My invention relates to apparatus for clearing land of stumps and roots, and is particularly adapted to uprooting stumps in wet, marshy places. My invention consists in the construction, arrangement, and combination of a V-shaped frame, forming a lifting-lever of great strength, on which is mounted a tripod of sufficient height and strength, which is provided with an adjustable hook or hooks, chains, or other suitable fixtures for grappling or making fast to a main root of a stump, and a vertical shaft or post, which may be so placed in relation to the lifting-levers as to form a jack, on which the lifting power is applied by connecting-rods with one or more sets of pulley-blocks and tackle, so that any required amount of power may be applied by man or horse to uproot ordinary stumps.

To enable others to make and use my invention, I will describe it more in detail, referring to the drawing and the letters marked thereon.

A A are timbers of any desired size and length, and they are fitted and framed or secured together at one end so as to form the shape of a long letter (>) V. This form is for a twofold purpose—*i. e.*, supporting a tripod, B, in such a position that it can be placed at any desired relation to any root or portion of a stump, and making a very strong lever to lift on one side, so that the larger portion of the main surface-roots can be taken out. It will be observed that one leg of the tripod B' is supported on a cross-timber, c, which rests on the levers A A, so that the strain of lifting is equalized on both of the levers, and a longer or shorter purchase can be given in proportion to what is required to turn out or uproot the stump D, the ends of the frame-levers A resting each side of the stump on some of the roots, or skids back of the center, so that as the stump is lifted on one side, or turned up, the fulcrum becomes shorter, giving more purchase. The tripod is provided with a ring, *a*, and a hook, *b*, and chain *d*, or any suitable device to fasten to one of the large roots that branch out near the surface of the ground, by which means the stump is turned up, one side at a time, and the larger portion of the surface-roots in moist land is drawn up with it.

The power applied to the levers A A to lift the root is by means of a jack-pole, E, with a foot, F, or cross-timber block on the bottom, which is placed in the fork of the levers near the distant end. The pole or jack E has a shoulder on the upper end on which is placed a loose ring, *e*, which will slip off when it is drawn over to a certain angle, and the draft and lifting on the levers A will continue, they being sufficiently elevated for the purpose. Chains or rods *f* and *g* may be used in connection with the levers A A and jack pole E', to which the block and tackle G is hitched, the other end being secured to a fast stump, *h*, and when the stumps are firmly rooted in dry or hard soil the pulling is greatly facilitated by the application of an additional set of blocks and tackle, H, as shown in Fig. 1, they having a separate hitching-stump or place, *j*, which greatly increases the power of the tackle G, and the strain is brought to bear on two ropes instead of one.

By the apparatus above described stumps of almost any size can be uprooted by men in moist or marshy soil, and, when desirable, teams of horses or oxen may be used with great success.

What I claim as my invention, and desire to secure by Letters Patent, is—

The construction, arrangement, and combination of the levers A A, the tripod B, with the vertical or upright standard or jack E, and one or more sets of pulley-blocks and tackle, G and H, to be operated by men or the power of a team, substantially in the manner as herein shown and described, for the purposes specified.

In testimony whereof I hereunto subscribe my name.

ALFRED DICKINSON.

Witnesses:
 STANLEY MARTIN,
 MORRIS PITCHER.